US010283299B2

(12) United States Patent
Mittelstadt

(10) Patent No.: US 10,283,299 B2
(45) Date of Patent: May 7, 2019

(54) MAGNETIC POSITION INDICATOR FOR MINIATURE CIRCUIT BREAKER HANDLE

(71) Applicant: SCHNEIDER ELECTRIC USA, INC., Andover, MA (US)

(72) Inventor: Chad Mittelstadt, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 10 days.

(21) Appl. No.: 15/128,184

(22) PCT Filed: Mar. 27, 2014

(86) PCT No.: PCT/US2014/031980
§ 371 (c)(1),
(2) Date: Sep. 22, 2016

(87) PCT Pub. No.: WO2015/147826
PCT Pub. Date: Oct. 1, 2015

(65) Prior Publication Data
US 2017/0098520 A1    Apr. 6, 2017

(51) Int. Cl.
*G01D 5/14*    (2006.01)
*H01H 71/04*    (2006.01)
*H01H 71/24*    (2006.01)
*H01H 71/10*    (2006.01)
*H01H 9/30*    (2006.01)

(52) U.S. Cl.
CPC ............ *H01H 71/04* (2013.01); *G01D 5/145* (2013.01); *H01H 9/30* (2013.01); *H01H 71/10* (2013.01);
(Continued)

(58) Field of Classification Search
USPC ........................................................ 307/112
See application file for complete search history.

(56) References Cited

U.S. PATENT DOCUMENTS 7,046,108 B2 *    5/2006    Lin ................... H01H 51/2209
                                                      335/132
7,403,015 B2    7/2008    Carlino et al.
(Continued)

FOREIGN PATENT DOCUMENTS

EP    0115391    *    8/1984
EP    0115391 A2    8/1984
(Continued)

OTHER PUBLICATIONS

International Search Report and Written Opinion dated Aug. 11, 2014 in PCT/US2014/031980, 11pp.
(Continued)

*Primary Examiner* — Hal Kaplan
*Assistant Examiner* — Xuan Ly
(74) *Attorney, Agent, or Firm* — Locke Lord LLP

(57) ABSTRACT

The status monitoring system for a circuit breaker (100) includes a movable handle (110) with a magnet (112), a magnetic sensor (140) and a processor (150). The magnet is movable with the handle. The magnetic sensor is arranged in proximity to the handle, and is used to sense a magnetic field produced from the magnet of the handle. The processor receives information of the sensed magnetic field from the magnetic sensor and determines a status of the circuit breaker based on the sensed magnetic field which relates to a position of the handle. The status of the circuit breaker may include a handle position (e.g., ON, OFF or TRIPPED position), a handle velocity or a handle acceleration. A diagnosis of breaker functionality may then be reported.

17 Claims, 9 Drawing Sheets

(52) U.S. Cl.
CPC ....... *H01H 71/24* (2013.01); *H01H 2071/048* (2013.01); *H01H 2235/01* (2013.01)

(56) References Cited

U.S. PATENT DOCUMENTS

| | | | |
|---|---|---|---|
| 2004/0130217 A1* | 7/2004 | Moldovan | H01H 71/04 307/125 |
| 2005/0139461 A1* | 6/2005 | McClung | H01H 71/70 200/330 |
| 2007/0273461 A1 | 11/2007 | Kang et al. | |
| 2011/0147178 A1 | 6/2011 | Larson | |
| 2013/0021163 A1 | 1/2013 | Watford | |
| 2013/0329331 A1* | 12/2013 | Erger | H02H 1/0084 361/102 |

FOREIGN PATENT DOCUMENTS

| | | |
|---|---|---|
| WO | 2011078957 A1 | 6/2011 |
| WO | WO 2011078957 * | 6/2011 |

OTHER PUBLICATIONS

"QO and QOB Miniature Circuit Breaker Accessories", Square D Publication, Jul. 2008, pp. 15-16.

"High Sensitivity Bipolar Latching Digital Hall Effect Sensor ICs", Sensing and Control, Honeywell, www.honeywell.com/sensing, Jun. 2012, 5 pp.

"A True System-on-Chip Solution for 2.4-GHz IEEE 802.15.4 and ZigBee Applications," Texas Instruments Product Guide, SWRS081B, Apr. 2009—Revised Feb. 2011, 36pp.

* cited by examiner

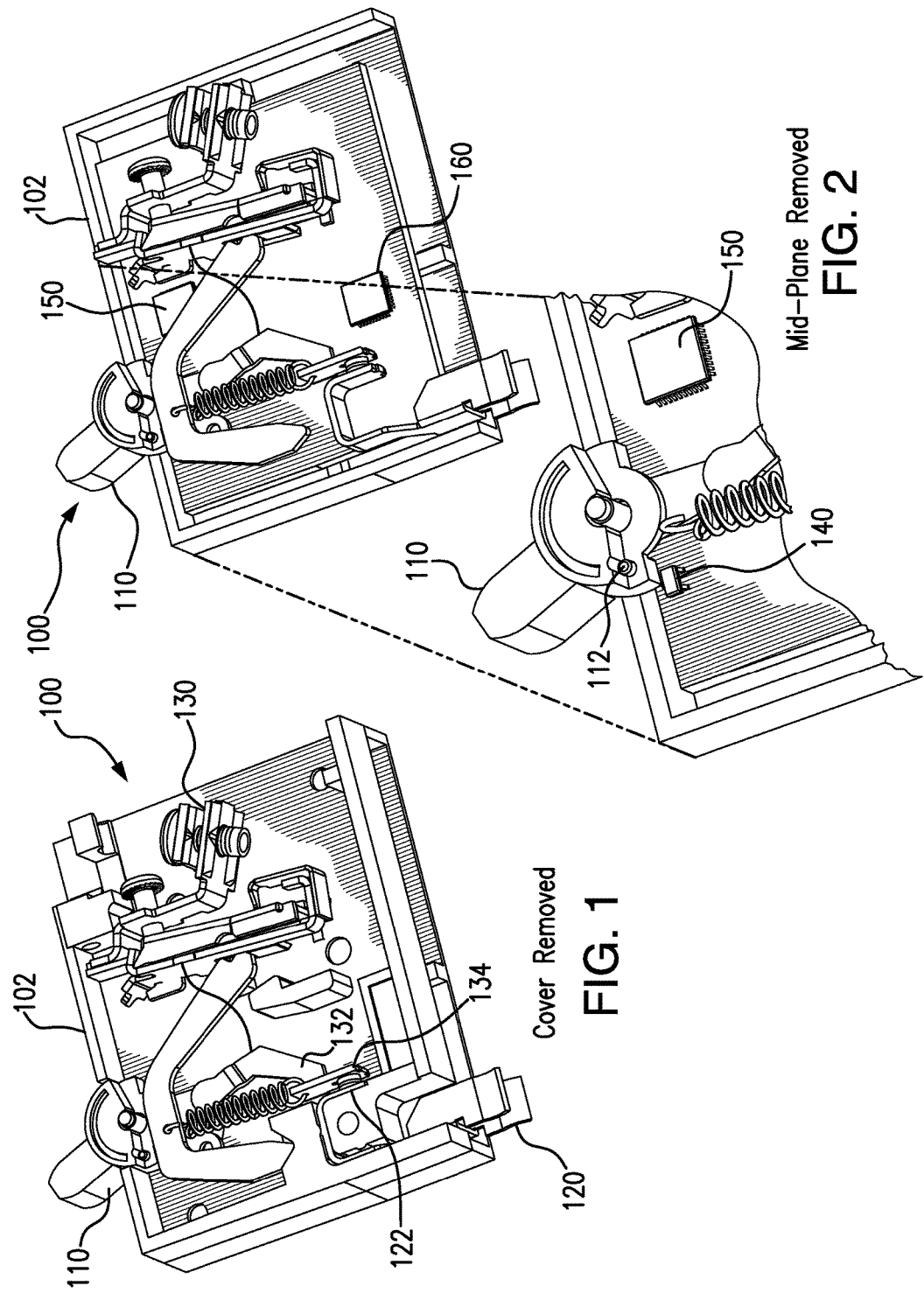

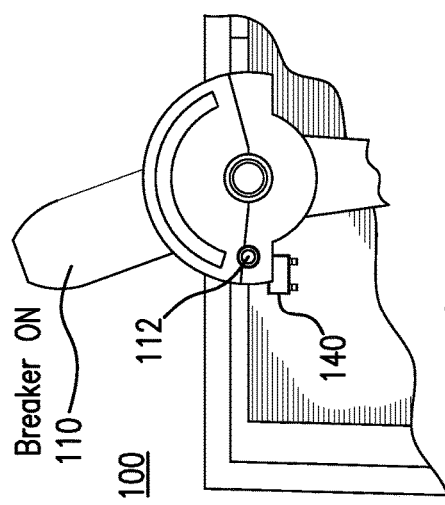
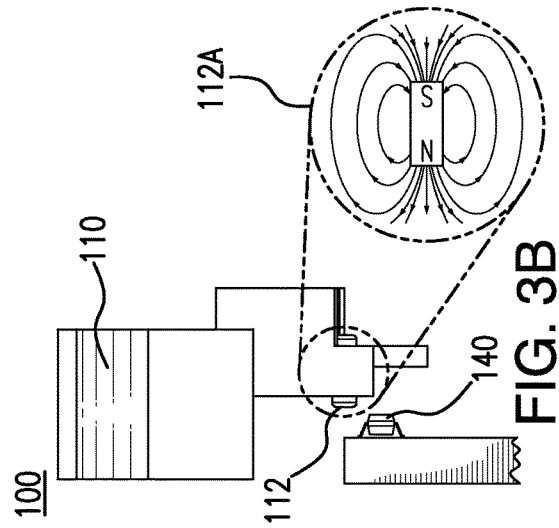
FIG. 3A
FIG. 3B
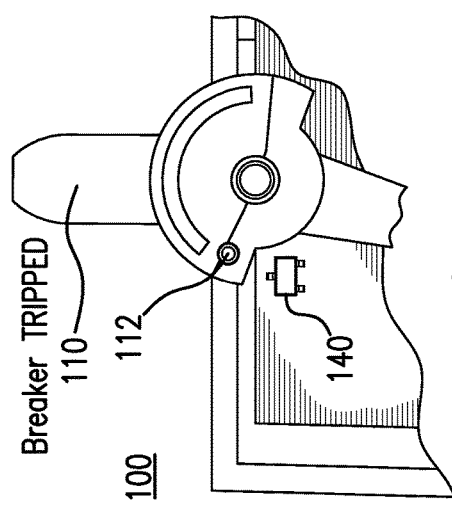
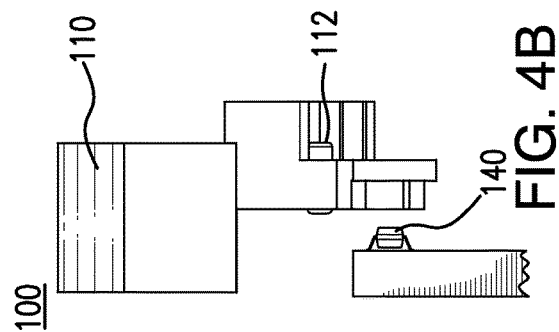
FIG. 4A
FIG. 4B
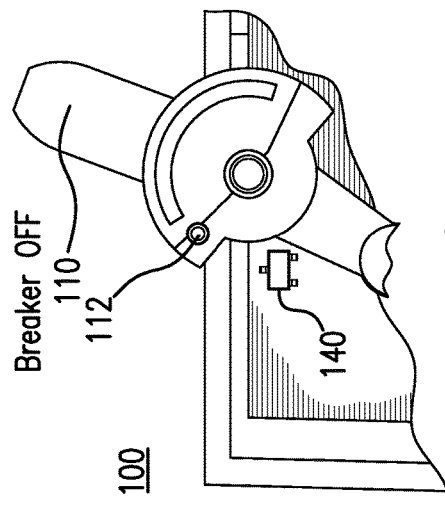
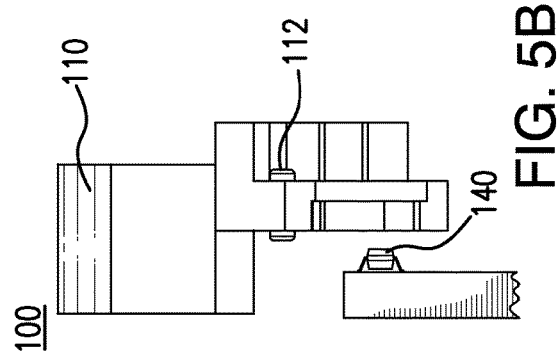
FIG. 5A
FIG. 5B

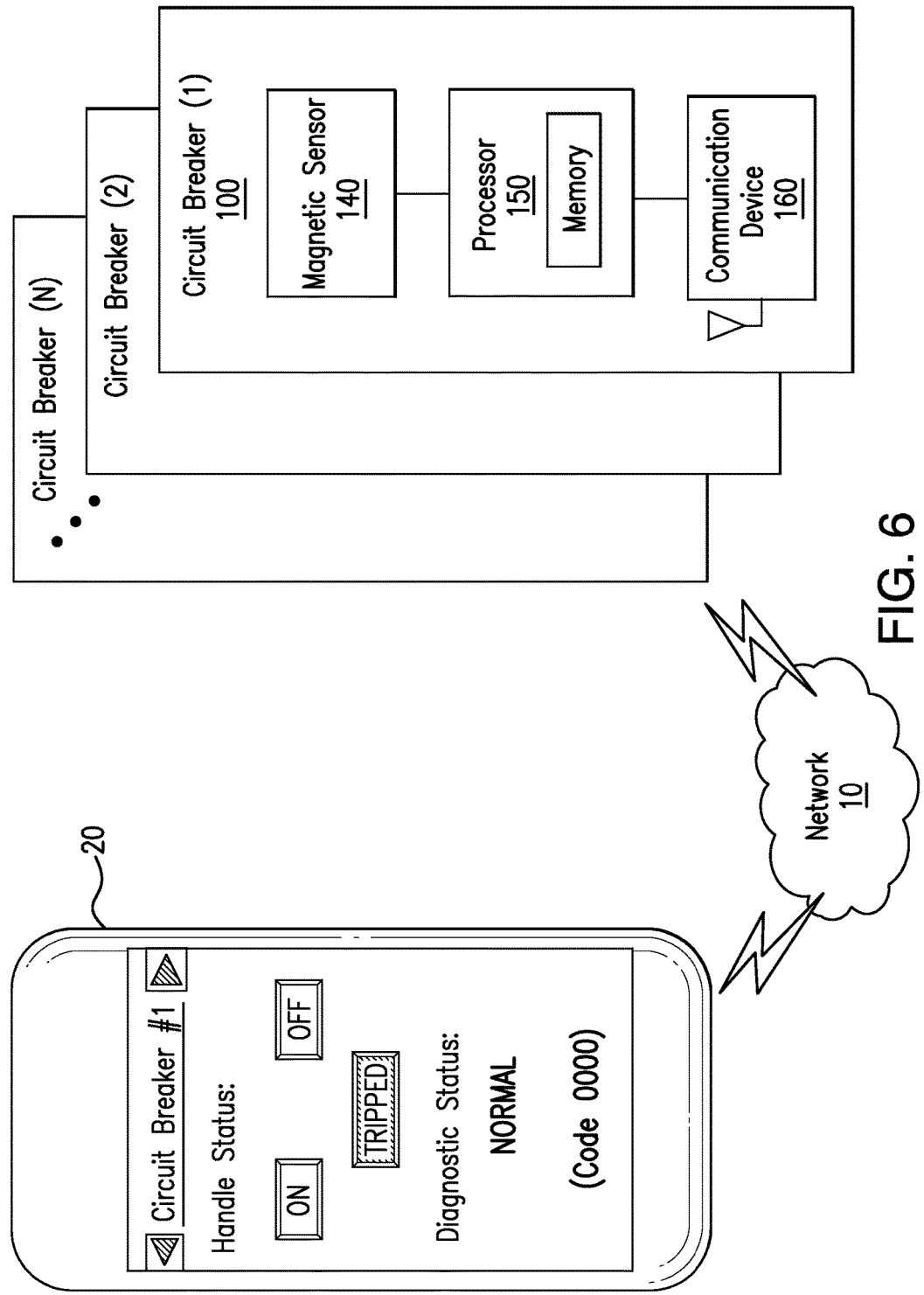

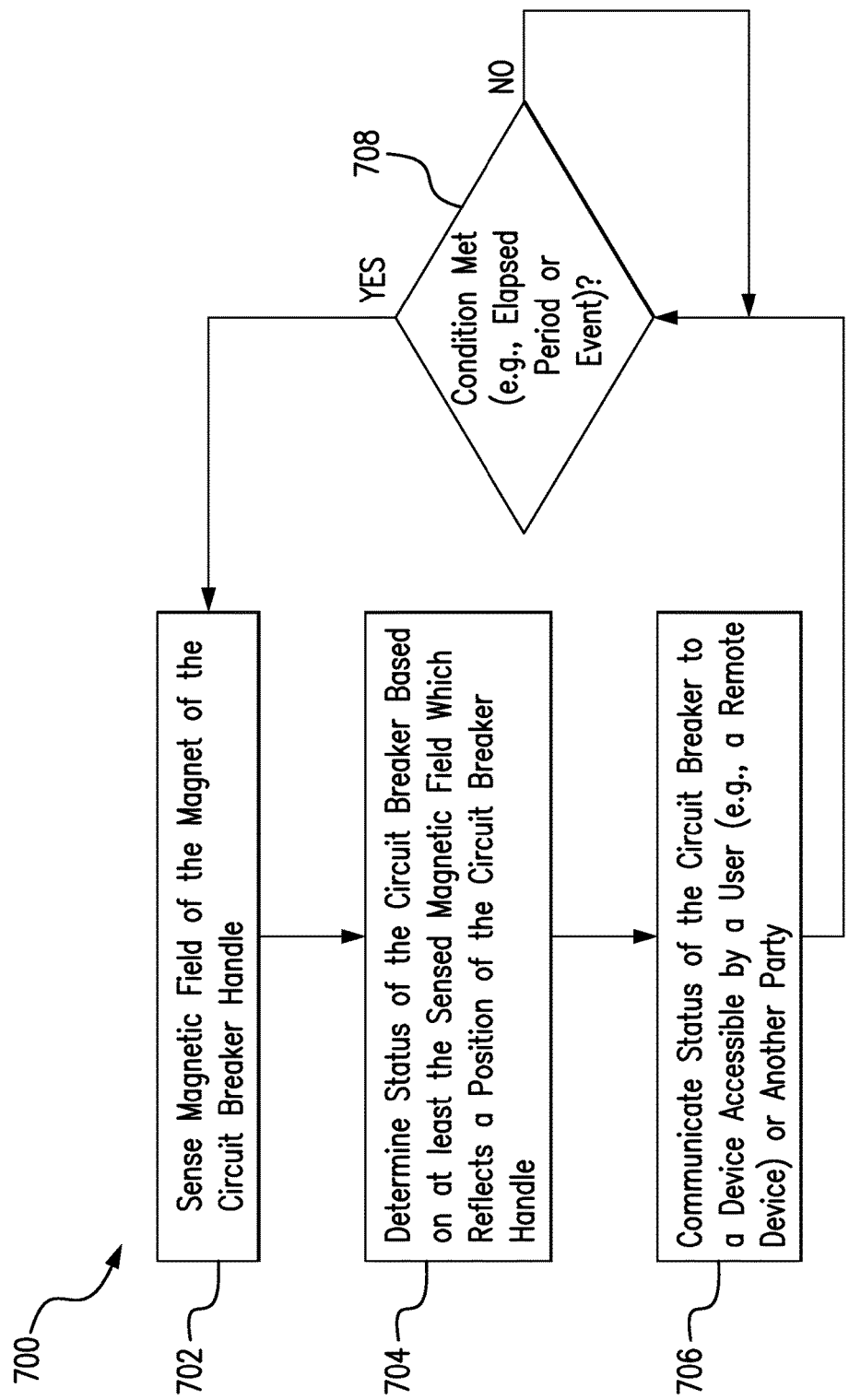

MAGNETIC POSITION INDICATOR FOR MINIATURE CIRCUIT BREAKER HANDLE

FIELD

The present disclosure relates to a status monitoring system for a circuit breaker, which employs a magnetic sensor.

BACKGROUND

A circuit breaker is an overcurrent protective device that is used for circuit protection and isolation. The circuit breaker provides electrical system protection when a designated electrical abnormality such as an overcurrent or overload event occurs in the system. One type of circuit breaker is a miniature circuit breaker (MCB), which is typically used for low voltage applications. An MCB typically includes a base and cover, and an electrical circuit between a line terminal and a load terminal. The electrical circuit includes a conductive stationary contact electrically connected to one of the terminals and a movable contact electrically connected to the other terminal. The movable contact is secured on a movable blade (also referred to as a contact carrier). A handle interfaces with the blade and the trip lever of the trip mechanism as further explained below. The handle can be operated by a user to move the blade, and thus the movable contact, between an open position and a closed position to open or close the electrical circuit. In the closed position, the movable contact is engaged with the stationary contact to allow current flow between the two contacts to a protected load. In the open position, the movable contact is disengaged from the stationary contact to prevent or interrupt current flow to the protected load.

The MCB also includes a trip mechanism. The trip mechanism controls a trip lever, which is connected to the blade via a tension spring (also known as a "toggle spring"). When an abnormal operating condition is detected (e.g., an over current or over temperature fault), the trip mechanism implements a trip operation to disengage the movable contact from the stationary contact by releasing or unlatching the trip lever, which in turn interrupts current flow to the protected load at another open position generally referred to as the tripped position. The handle is also moved to the tripped position. Thereafter, the circuit breaker can be returned to an open position. Once in the open position, the user can move the breaker back to the closed position via the handle. The handle position provides a user with the operational status of the MCB; however, the user must visually inspect the circuit breaker to observe its status. Thus, the user may be unaware of the operational status of a particular circuit breaker, particularly when it is tripped or is not operating properly. Furthermore, there are significant design restrictions when incorporating additional status monitoring components into a circuit breaker. For example, a circuit breaker, such as a MCB, is subject to size constraints.

SUMMARY

To address these and other shortcomings, a circuit breaker is provided with a status monitoring system which uses a magnetic sensor and a magnet incorporated with the circuit breaker handle to identify an operational status of the circuit breaker. The status monitoring system is able to use solid state electronics instead of complex mechanical micro switches to communicate the status of a circuit breaker to a user. The status monitoring system is thus smaller, more reliable, electrically isolated and easier to fit into circuit breakers, such as miniature circuit breakers which are subject to size constraints.

For example, the status monitoring system for a circuit breaker includes a movable handle with a magnet, a magnetic sensor, and a processor. The magnetic sensor (e.g., a Hall Effect sensor) is arranged in proximity to the handle, and is used to sense a magnetic field produced from the magnet of the handle. The processor receives information of the sensed magnetic field from the magnetic sensor and determines a status of the circuit breaker based on the sensed magnetic field which relates to a position of the handle. The different positions of the circuit breaker handle correspond to different operational statuses of the circuit breaker, such as ON, OFF or TRIPPED position. The processor may also determine other status information related to the handle, such as the handle velocity or acceleration by evaluating a plurality of measurements of the magnetic field sensed by the magnetic sensor over a period of time during operation of the circuit breaker (e.g., from OFF to ON position, ON to OFF position, ON to TRIPPED position, or TRIPPED to OFF position). The determined status can then be communicated, such as via wireless transmission, to a remote device for output to the user. Accordingly, the status of one or more circuit breakers, such as in a load center, can be communicated to the user or another party (e.g., a monitoring service, device manufacturer, etc.).

In accordance with a further embodiment, the processor can determine a diagnostic status of the circuit breaker based on the determined position, velocity or acceleration of the handle. For example, the processor can compare the determined position, velocity or acceleration of the handle to an expected position, velocity or acceleration to ascertain if the circuit breaker is operating within normal parameters. If the circuit breaker is not operating within normal parameters, it may indicate an electrical or mechanical problem with the circuit breaker mechanism.

BRIEF DESCRIPTION OF THE DRAWINGS

The description of the various exemplary embodiments is explained in conjunction with the appended drawings, in which:

FIG. 1 illustrates a side view of a circuit breaker with one side of a cover removed to show exemplary internal components of the circuit breaker, in accordance with an embodiment.

FIG. 2 illustrates a side view of the circuit breaker of FIG. 1 with a mid-plane removed to show components of the circuit breaker.

FIGS. 3A and 3B illustrate partial frontal and end views, respectively, of the circuit breaker of FIG. 1 in an ON position.

FIGS. 4A and 4B illustrate partial frontal and end views, respectively, of the circuit breaker of FIG. 1 in a TRIPPED position.

FIGS. 5A and 5B illustrate partial frontal and end views, respectively, of the circuit breaker of FIG. 1 in an OFF position.

FIG. 6 illustrates an overall system view of a plurality of circuit breakers, such as in FIG. 1, in communication with a remote device across a network, in accordance with an embodiment.

FIG. 7 illustrates an exemplary process by which a circuit breaker, such as in FIGS. 1 and 2, monitors a status of the circuit breaker, such as the handle position, velocity or acceleration, in accordance with an embodiment.

DETAILED DESCRIPTION

Figure 8:
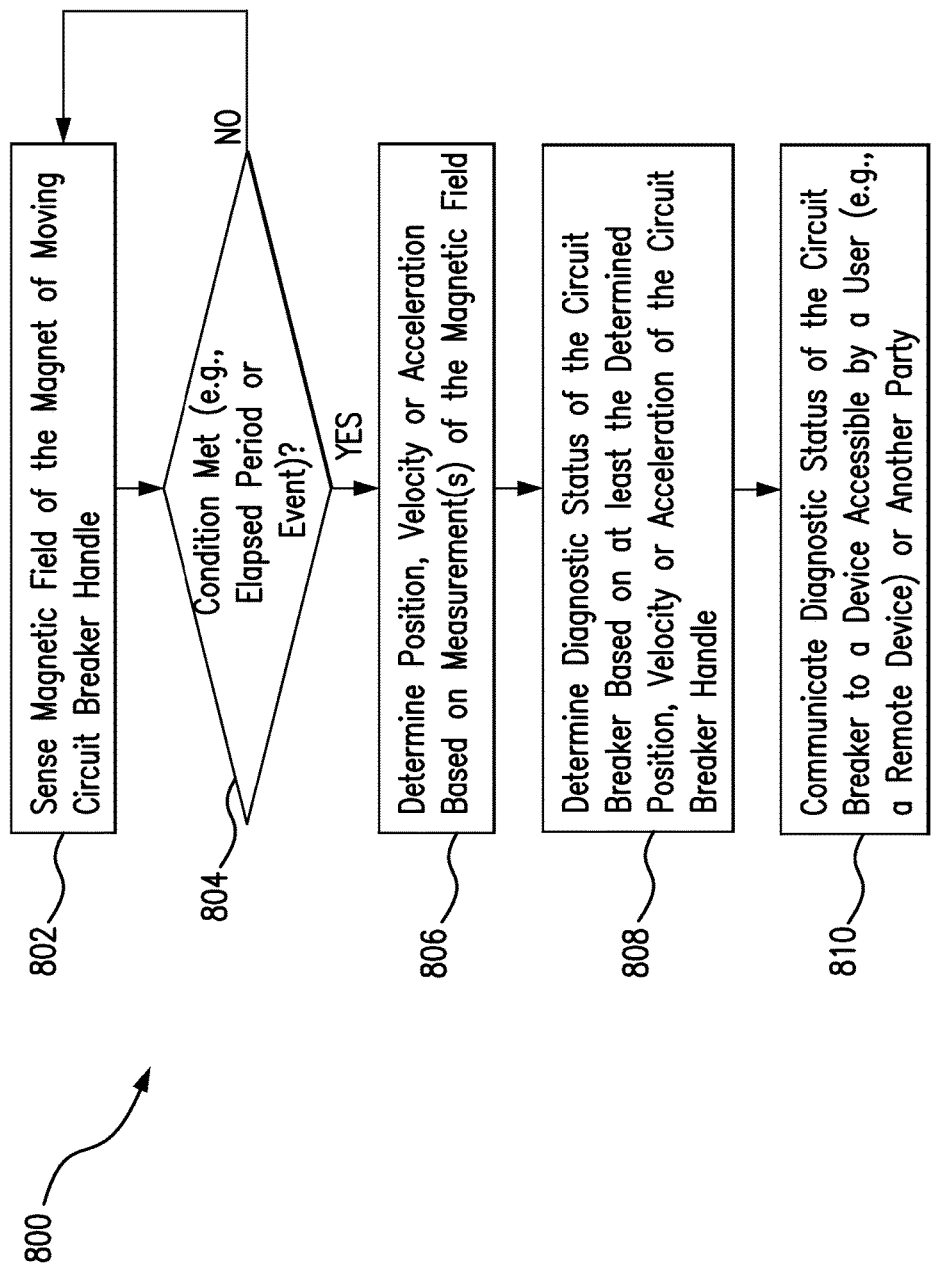
FIG. 8 illustrates an exemplary process by which a circuit breaker, such as in FIGS. 1 and 2, monitors a status of the circuit breaker, such as a diagnostic status, in accordance with an embodiment.

By way of general discussion, a miniature circuit breaker (MCB) of the type discussed herein may generally have a dielectric cover and base with interior compartments or recesses containing, for example, a conductive stationary contact, a conductive blade (also referred to as a contact carrier) with a conductive movable contact, an arcing chamber, and a handle assembly. The MCB also includes a trip mechanism, such as a trip lever, a tension spring and a trip lever actuator assembly (e.g., yoke, armature and bimetal). The handle of the MCB is connected to the blade to give the operator the ability to turn the circuit breaker ON (in the closed position) to energize a protected circuit or OFF (in the open position) to disconnect the protected circuit, or to reset the circuit breaker from a TRIPPED position after it trips to protect the circuit. A conductive line-side terminal and load-side terminal will extend through the cover for connecting the circuit breaker to the intended electrical conductors. A general description and illustration of these known parts of a miniature circuit breaker as a whole can be found in U.S. Pat. No. 5,245,302 for the edification of the reader should such be needed, but will not be further discussed in particular detail herein. A status monitoring system for a circuit breaker, particularly a miniature circuit breaker, will be described below with reference to FIGS. 1 through 12, in accordance with the present disclosure.

FIG. 1 shows a side view of a miniature circuit breaker 100 with one side of its cover removed to show some of the components thereof. The circuit breaker 100 includes a cover and base (together referred to as cover 102) having compartments and recesses for retaining components of the breaker. The components of the circuit breaker 100 may include a movable handle 110, a first terminal 120 electrically connected to a stationary contact 122, and a second terminal 130 electrically connected to a blade 132 with a movable contact 134. The first terminal 120 can be a line terminal connected to a power line, and the second terminal 130 can be a load terminal connected to a protected load on a branch circuit. The handle 110 is connected to the blade 132. In this example, the handle 110 is pivotally connected via mechanical fasteners to the blade 132, but may be movably connected through other types of connections (e.g., a wedge connection such as a tab and slot, a tab and notch, etc.). The handle 110 can be operated by a user between an open position (e.g., OFF position) and a closed position (e.g., ON position), or automatically operated to a TRIPPED position when the circuit breaker is tripped due to an abnormal condition. As shown in FIG. 1, in the ON position, the movable contact 134 is engaged to the stationary contact 122 to allow the flow of current from the power line connected to the first terminal 120 to the protected load. In the OFF and TRIPPED positions, the movable contact 134 would be disengaged from the stationary contact 122 to prevent the flow of current to the protected load connected to the second terminal 130.

As shown in FIG. 2, the circuit breaker 100 also includes a status monitoring system, which employs a magnet and a magnetic sensor, which are used to determine a status of the circuit breaker 100. For example, the circuit breaker 100 includes a magnet 112 movable with the handle 110, a magnetic sensor 140 for sensing a magnetic field produced by the magnet 112, a processor 150 for determining a circuit breaker status based on the sensed magnetic field, and a communication device 160 for communicating the circuit breaker status to a remote location. In this example, the magnet 112 is formed as a dowel, which is incorporated into the handle 110. The magnetic sensor 140, processor 150 and communication device 160 can be provided on a printed circuit board, which is incorporated into the circuit breaker 100.

The magnetic sensor 140 is located proximate to the magnet 112 (or vice-a-versa), and senses a magnetic field produced by the magnet 112. The magnetic field sensed by the magnetic sensor 140 corresponds to a position of the handle 110 relative to the position of the magnetic sensor 140. Accordingly, the magnetic field sensed by the magnetic sensor 140 changes as the handle 110, and thus, the magnet 112, moves from one position to another position. The magnetic sensor 140 can be a Hall Effect sensor.

The processor 150 can be a microcontroller(s), microprocessor(s) or other control circuitry such as an application-specific integrated circuit (ASIC) or field-programmable gate array (FPGA), and may include a memory to store data and computer executable programs or codes, which when executed, may control among other things the components and operations of the status monitoring system of the circuit breaker 100. The processor 150 may be the processor in the tripping unit for a circuit breaker that performs the detection of abnormal condition, facilitates tripping of the circuit breaker and stores event data (e.g., trip event) in a memory. In various embodiments, the processor 150 may be configured to determine a status of the circuit breaker 100 based on at least the sensed magnetic field of the magnet movable with the handle 110. The status may include a handle status (e.g., ON, OFF or TRIPPED position, velocity of the handle, and acceleration of the handle) or a diagnostic status of the circuit breaker, as further discussed below. The processor 150 may diagnose, i.e. determine the diagnostic status of, the circuit breaker 100 based on the determined handle position, velocity, acceleration, and/or other relevant circuit breaker information (e.g., a trip event) such as stored in memory or a combination thereof.

Furthermore, where the circuit breaker is an electronic or hybrid electronic/mechanical circuit breaker, the processor of the circuit breaker may coordinate operation of mechanical components (e.g., the contacts) and electronic components (e.g., the solid state switch(es) such as a switching transistor(s), thyristor(s) or triac) based on the determined handle position, velocity and/or velocity during a tripping operation. For example, the processor may control the timing of the opening and closing of the solid state switch, via control signal(s), based on the handle position, velocity and acceleration so that the contacts are the last component to close and the first component to open while leaving the solid state switch ON for only a short time period. Examples of various circuit breaker status monitoring and control operations are described further below with reference to FIGS. 7-9, 11 and 12.

The communication device 160 can be a transceiver (e.g., a transmitter and receiver), which transmits and receives signals using wire-line or wireless communications. For example, as discussed herein, the communication device 160 is used to communicate status information concerning the circuit breaker 100 to another device or system. The status information signal can be transmitted as a unidirectional, bi-directional or broadcasted signal, via wire-line or wireless communications. The communication device 160 can also be used to receive transmissions, such as remote commands. The remote commands may include a request, such as from a user or a third party, to implement a status monitoring operation for a selected circuit breaker(s) or all circuit breakers.

FIGS. 3A and 3B illustrate partial frontal and end views, respectively, of the circuit breaker 100 of FIGS. 1 and 2 in the ON position. As shown in FIG. 3B, the magnet 112 produces a magnetic field, such as shown by the reference 112A, which is sensed by the magnetic sensor 140. In this example, the north pole of the magnet is closer to the magnetic sensor 140. FIGS. 4A and 4B illustrate partial frontal and end views, respectively, of the circuit breaker 100 of FIGS. 1 and 2 in a TRIPPED position. FIGS. 5A and 5B illustrate partial frontal and end views, respectively, of the circuit breaker 100 of FIGS. 1 and 2 in an OFF position. As shown in these Figures, the magnetic field sensed by the magnetic sensor 140 varies according to a location of the magnet 112 relative to the location of the magnetic sensor 140. For example, the location of the magnet 112, and thus, the magnetic field sensed by the magnetic sensor 140, differs in the ON position (FIGS. 3A and 3B), TRIPPED position (FIGS. 4A and 4B) and OFF position (FIGS. 5A and 5B).

FIG. 6 illustrates an overall system view of a plurality of circuit breakers, such as a plurality of circuit breakers 100 (in FIGS. 1 and 2), in communication with a remote device 20 across a network 10. The remote device 20 may be a computerized system with communication capability, such as a smartphone (shown) or a computer (e.g., mobile computer, tablet, server, etc.). The circuit breakers 100 may be located in one or more load centers. As shown, each circuit breaker 100 may communicate status information to the remote device 20, via the network 10. The status information may include a handle position status of the circuit breaker 100, e.g., ON, OFF or TRIPPED position, based on the determined position of the handle. Other handle status information may also be communicated, such as the handle velocity or acceleration associated with a handle operation. The status information may also include diagnostic status information, to reflect whether the circuit breaker is operating within specified parameters. As previously discussed, the circuit breaker 100 is able to determine diagnostic status (e.g., NORMAL or ABNORMAL, etc.) based on the monitored position, velocity or acceleration of the circuit breaker handle. A circuit breaker may be in an abnormal state when the determined position, velocity or acceleration of the handle is not within normal operating parameters (e.g., a threshold or threshold range), and may reflect damaged or inefficient operation of electrical or mechanical components of the circuit breaker 100.

FIG. 7 illustrates an exemplary process 700 by which a circuit breaker, such as the circuit breaker 100 in FIGS. 1 and 2, monitors a status of the circuit breaker, such as the handle position, velocity or acceleration, in accordance with an embodiment.

At reference 702, the magnetic sensor 140 senses a magnetic field of the magnet 112 movable with the circuit breaker handle 110. At reference 704, the processor 150 receives a signal(s) corresponding to the sensed magnet field, and determines a status of the circuit breaker based on the sensed magnetic field, which reflects a position of the circuit breaker handle. For example, the handle position status may include ON, OFF or TRIPPED position or other handle positions available on the circuit breaker. The processor 150 may also determine other status information related to the handle 110, such as the handle velocity or acceleration by evaluating a plurality of measurements of the magnetic field sensed by the magnetic sensor 140 over a period of time during operation of the circuit breaker 100 (e.g., from OFF to ON position, ON to OFF position, ON to TRIPPED position, or TRIPPED to OFF position). For example, velocity is the change in distance over a period of time, and acceleration is the change in velocity over a period of time. The processor 150 can be selected with sufficient processing speed to sample and process measurements taken from a magnetic sensor, such as a Hall Effect sensor, to determine an instantaneous velocity or acceleration of the handle 110 during operation (e.g., from ON to OFF position, OFF to ON position, ON to TRIPPED position, and TRIPPED to OFF position).

At reference 706, the communication device 160 communicates the status of the circuit breaker to a device accessible by a user (e.g., a remote device 20 such as in FIG. 6) or another party (e.g., a monitoring system or service, the product manufacturer, etc.). The operations in references 702 through 706 may be repeated in response to a condition, e.g., after an elapsed period or an occurrence of an event, at reference 708. For example, the circuit breaker 100 may implement process 700 under control of the processor 150 periodically at predetermined time intervals, randomly, or upon a user command (e.g., a local command or remote command received by the communication device 160). Furthermore, the status and associated data (including raw measurement data) may be stored in a memory that is maintained locally at the circuit breaker or remotely for subsequent access and evaluation.

FIG. 8 illustrates an exemplary process 800 by which a circuit breaker, such as the circuit breaker 100 of FIGS. 1 and 2, monitors a status of the circuit breaker, such as a diagnostic status, in accordance with an embodiment.

At reference 802, the magnetic sensor 140 senses a magnetic field of the magnet 112 movable with the circuit breaker handle 110. At reference 804, the processor 150 determines whether a condition has been met, e.g., elapsed period or an occurrence of an event. For example, the processor 150 may sample one or more measurements of the magnetic field sensed by the magnetic sensor 140 at a specified time or over a time period involving a circuit breaker operation (e.g., movement from ON to OFF position, OFF to ON position, ON to TRIPPED position, or TRIPPED to OFF position). The processor 150 may also sample one or more measurements of the magnetic field sensed by the magnetic sensor 140 until an operation is completed (e.g., the handle stops during operation thereof).

At reference 806, the processor 150 determines a current position of the handle 110 based on the sensed magnetic field, or determines the velocity or acceleration of the handle 110 based on a plurality of the measurements of the magnetic field sensed by the magnetic sensor 140 over a period of time. As previously discussed, the processor 150 can be selected with sufficient processing speed to sample and process measurements taken from a magnetic sensor to determine an instantaneous velocity or acceleration of the handle 110 during operation (e.g., from ON to OFF position, OFF to ON position, ON to TRIPPED position, and TRIPPED to OFF position).

At reference 808, the processor 150 determines a diagnostic status of the circuit breaker 100 based on the determined position, velocity and/or acceleration of the handle. For example, the determined position, velocity and/or acceleration can be compared to an expected position, velocity or acceleration to ascertain whether the handle is operating within a normal operating range. The expected values for handle position (e.g., ON, OFF or TRIPPED position) or handle velocity or acceleration during circuit breaker operations may be stored in memory, which is accessible by the processor 150.

For example, the processor 150 may determine a position diagnostic status of the circuit breaker based on the determined current position of the handle 110. The processor 150 can compare the current position of the handle 110 to an expected position, and determine if the current position meets a threshold for normal operating parameters of the ON, OFF or TRIPPED position. The processor 150 may identify an expected handle position from an operational history of the circuit breaker stored in a memory of the circuit breaker (e.g., an occurrence of a trip event), or based on a proximity of the current handle position to a known handle position. The processor 150 may then obtain values associated with the expected position for comparison. If the determined handle position deviates from the expected handle position outside an acceptable handle position range (e.g., ±Δ distance or ±Δ amount of magnetic field), the processor 150 determines (i.e. diagnoses) that the circuit breaker 100 is not operating properly, e.g., is operating in an abnormal state. The severity of the position deviation may reflect the nature of the underlying problem, such as the handle being stuck in the ON, OFF or TRIPPED position, or not completely moving to the ON, OFF or TRIPPED position (e.g., 100% in the ON, OFF or TRIPPED position). The abnormal status may reflect that (1) there is interference to the handle assembly from a piece of equipment, (2) the contacts inside the breaker are stuck together (welded), or (3) there is a malfunction of the circuit breaker mechanism.

The processor 150 may also determine a diagnostic status of the circuit breaker based on the determined velocity or acceleration of the handle 110. The processor 150 can compare the determined velocity or acceleration of the handle 110 to an expected velocity or acceleration of the handle 110 for different operations which should produce specific handle movements. If the determined velocity or acceleration of the handle 110 deviates from the expected velocity or acceleration for these operations, the processor 150 determines that the circuit breaker 100 may not be operating within normal parameters or is being operated by the user outside of desired parameters. That is, the processor 150 determines that the circuit breaker 100 is operating or being operated in an abnormal or undesirable state. For example, the handle 110 of the circuit breaker 100 may be moving too slowly or too fast during a trip operation (e.g., from ON to TRIPPED position), which may reflect a malfunction in the circuit breaker mechanism. Further, the user may be operating the handle 110 of the circuit breaker 100 in an undesirable manner, e.g., slamming the handle between the ON and OFF positions, or teasing the handle by moving it very slowly.

At reference 810, the communication device 160 communicates the diagnostic status of the circuit breaker (e.g., Normal, Abnormal, etc.) to a device accessible by a user (e.g., a remote device 20 such as in FIG. 6) or another party such as a monitoring service or the product manufacturer. The diagnostic status may be communicated as a general status, e.g., NORMAL or ABNORMAL, or a specific status (e.g., Outside of Expected Range in ON Position (Code 1111), Outside of Expected Range in OFF Position (Code 2222), Outside of Expected Range in TRIPPED Position (Code 3333), Stuck in ON position (Code 4444), Abnormal Position (Code 5000), Abnormal Velocity (Code 5001), Abnormal Speed (Code 5002), etc.).

The operations described in references 802 through 810 may be implemented under control of the processor 150, and repeated in response to a condition, e.g., occurrence of a handle operation from one position to another position, a trip operation, receipt of a request (e.g., a user command, or command from a third party), and so forth. Furthermore, the diagnostic status and associated data may be stored in a memory for subsequent access and evaluation.

In accordance with a further embodiment, the status monitoring system of the present disclosure may be used to enable electronic switching or hybrid switching (such as used in large fully electronic or hybrid circuit breakers) in smaller sized circuit breakers, e.g., miniature type circuit breakers. A fully electronic circuit breaker, also sometimes known as a circuit interrupter, includes only electronic components such as solid state components (e.g., a solid state switch(es)), and no mechanical-type electrical contacts. A hybrid circuit breaker includes one or more electronic components, and one or more sets of mechanical-type electrical contacts.

Hybrid switching provides various benefits, including the ability to switch higher current and voltage levels versus a standard mechanical switch, with less or no damage to the electrical contacts because the potential for arcing is minimized or eliminated through the use of solid state components. Hybrid switching typically involves the following operations. For example, when a hybrid circuit breaker is operating from an OFF to ON operational status, the solid state components of the circuit breaker are first turned on, then the electrical contacts are closed, and finally the solid state components are turned off. When the hybrid circuit breaker is operating from an ON to OFF operational status, the solid state components are first turned on, the electrical contacts are then opened, and finally the solid state components are turned off. If a relay or contactor is used, the order of operation may be established from a circuit breaker control system that is going to the coils. Another control circuit may be added to the solid state components, which can then be timed with the control system of the circuit breaker.

It is difficult to implement a hybrid switching configuration in smaller circuit breakers which do not include a control system to turn ON and OFF the breaker. In smaller circuit breakers, the ON and OFF operations are typically performed by a user (e.g., a user's hand motion) through operation of the circuit breaker handle. By employing the status monitoring system in the present disclosure, it is possible to implement hybrid switching in smaller circuit breakers. The status monitoring system can be used to accurately detect the circuit breaker handle operation by the user. The detected information can then be used to control the solid state components (e.g., a solid state switch) via a processor (e.g., a microprocessor or microcontroller). Thus, a smaller hybrid circuit breaker can be designed with solid state components that can be turned on and off correctly with the electrical contacts. An example of a hybrid circuit breaker implementation is shown with reference to FIGS. 9 through 12, discussed below.

Figure 9:
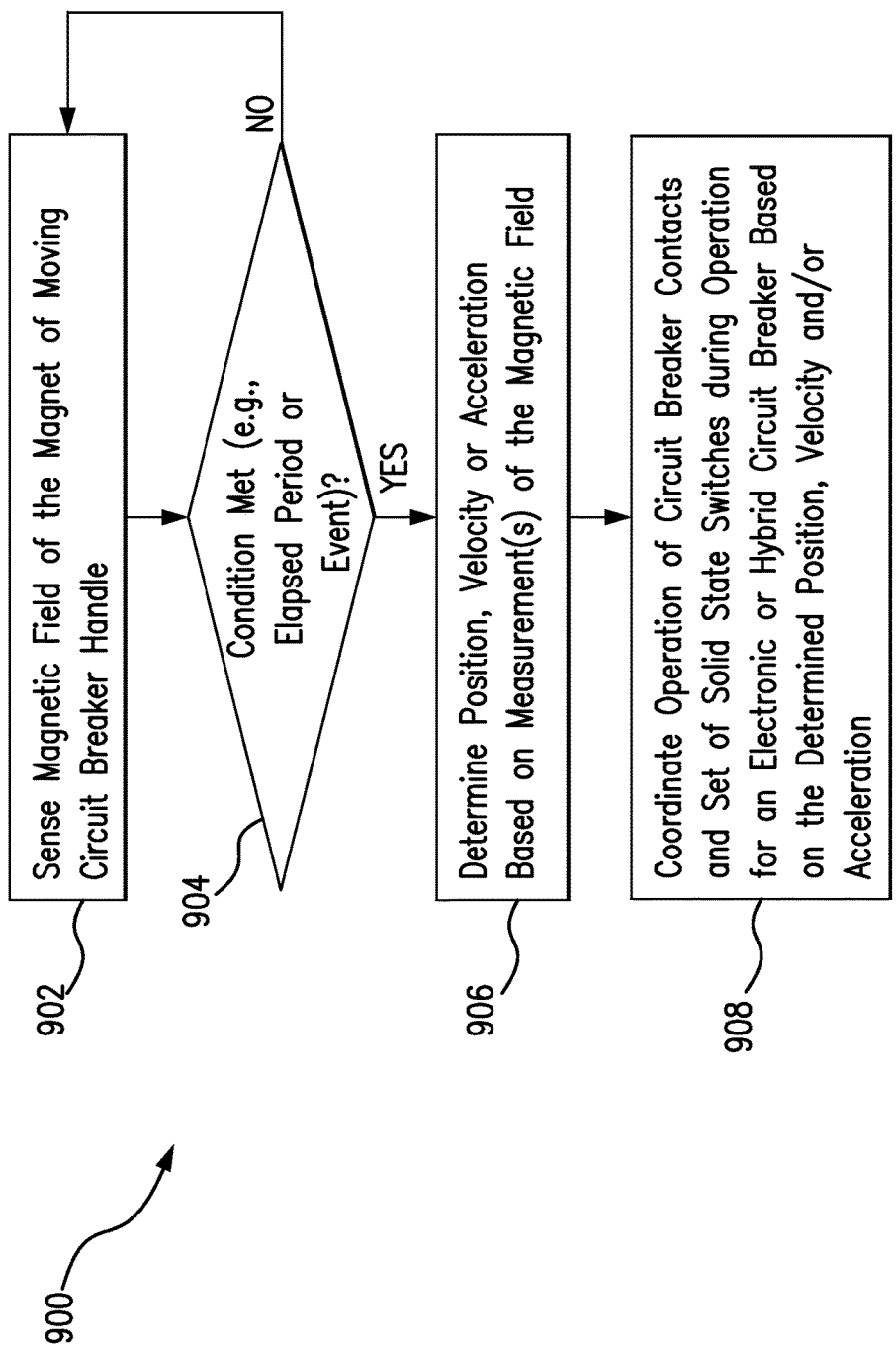
FIG. 9 illustrates an exemplary process by which a circuit breaker, such as a hybrid circuit breaker, coordinates operations of its mechanical components (e.g., electrical contacts) and electronic components (e.g., a solid state switch(es)) based on the monitored position, velocity and acceleration of the handle, in accordance with an embodiment.
Figure 10:
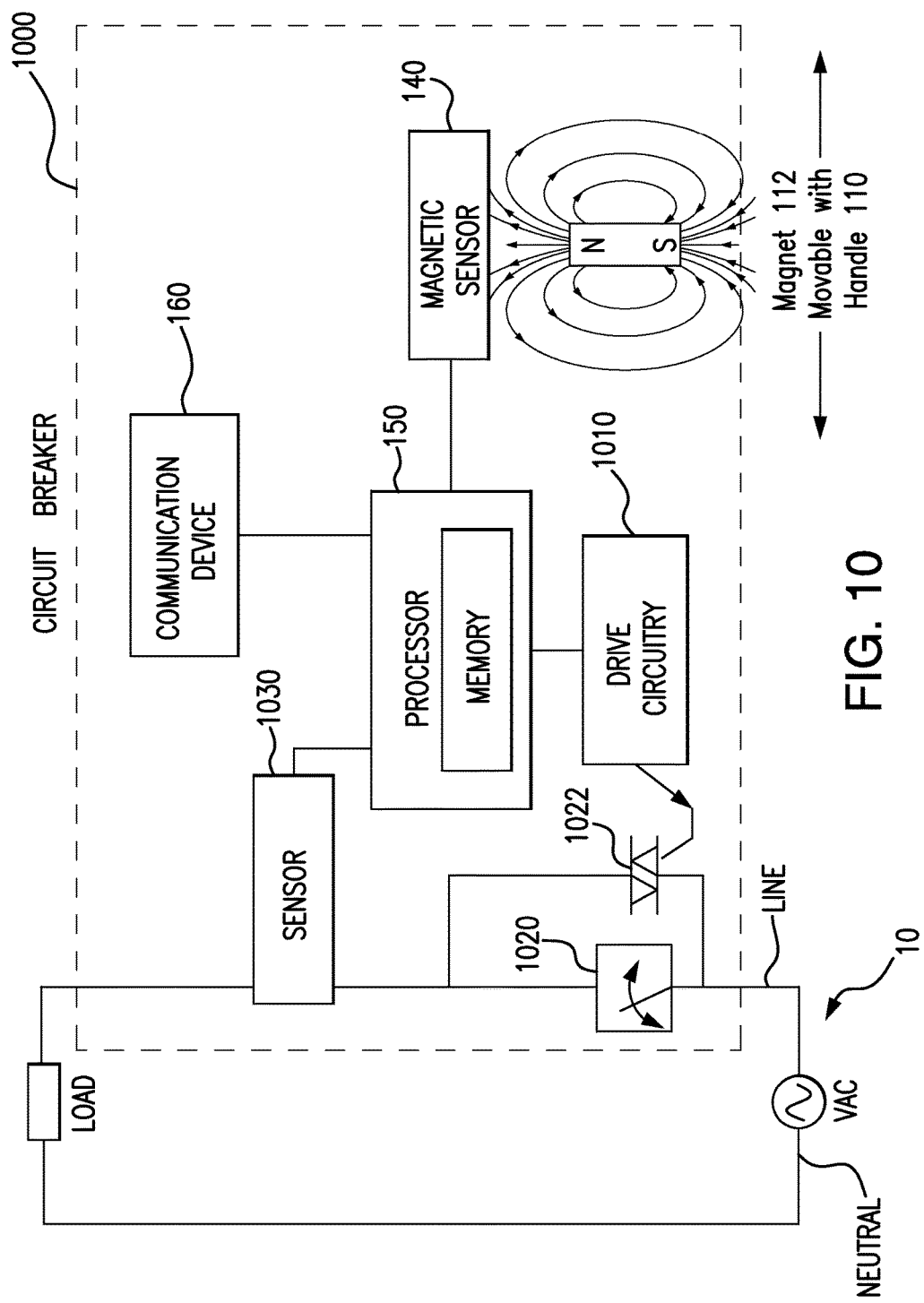
FIG. 10 illustrates a block diagram of exemplary components of a hybrid circuit breaker, which implements the process of FIG. 9.

FIG. 10 illustrates exemplary components of a hybrid circuit breaker 1000. The hybrid circuit breaker 1000 may include similar components as in circuit breaker 100, such as a processor 150, a handle 110, a magnet 112, and magnetic sensor 140, except that the electrical contacts (shown as contacts 1020 of a switch mechanism) are operated by the processor 150 via drive circuitry 1010 which controls a solid state switch connected in parallel with the electrical contacts. In this example, the solid state switch is a triac 1022. The circuit breaker 1000 may also include a sensor(s) 1030 for detecting an abnormal condition in a circuit 10, such as for example current transformers, current shunt or Hall Effect current sensors. The sensor 130 may be employed to evaluate voltage separately or in addition current, such as performed in a Combination Arc-Fault Interrupter (CAFI) breaker. When implementing circuit breaker operations, the processor 150 coordinates the operation of mechanical components (e.g., the electrical contacts 1020) and electronic components (e.g., the solid state switch such as the triac 1022) based on a determined position, velocity and/or acceleration of the handle 110, such as described by the process 900 of FIG. 9. The hybrid switching configuration in FIG. 10 provides various benefits, such as low silver usage, no bounce, high precision control, long life, low resistance and low wear. Although FIG. 10 describes a hybrid circuit breaker with one set of electrical contacts 1020, the hybrid circuit breaker may include two sets of electrical contacts to further eliminate leakage. The hybrid circuit breaker may also include a positive temperature coefficient (PTC) resistivity element connected to the electrical contacts to limit current. The second set of electrical contacts and the PTC resistivity element can be connected in series with the solid state switch.

FIG. 9 illustrates an exemplary process 900 by which a hybrid circuit breaker monitors a status of the circuit breaker and controls operations of circuit breaker components in accordance with an embodiment. The process 900 will be described with reference to the exemplary hybrid circuit breaker 1000 in FIG. 10.

As shown in FIG. 9, at reference 902, the magnetic sensor 140 senses a magnetic field of the magnet 112 movable with the circuit breaker handle 110. At reference 904, the processor 150 determines whether a condition has been met, e.g., elapsed period or an occurrence of an event. For example, the processor 150 may take at a specified time or sample over a time period one or more measurements of the magnetic field sensed by the magnetic sensor 140 or during a circuit breaker operation (e.g., from ON to OFF position, OFF to ON position, ON to TRIPPED position, or TRIPPED to OFF position).

At reference 906, the processor 150 may determine a current position of the handle 110 based on the sensed magnetic field. The processor 150 may also determine the velocity or acceleration of the handle based on a plurality of the measurements of the magnetic field sensed by the magnetic sensor 140 over a period of time.

At reference 908, the processor 150 coordinates operation of the circuit breaker contacts 1020 and switching transistors of the drive circuitry 1010 during operation for the circuit breaker 1000 based on at least the determined position, velocity and/or acceleration. For example, the processor 150 may control the timing sequence of the opening and closing of the solid state switch, via control signal(s), based on the handle position, velocity and acceleration so that the contacts 1020 are the last component to close and the first component to open while leaving the solid state switch (e.g., the triac 1022) ON for only a short time period. For example, when operating from an OFF to ON operation, the triac 1022 is first turned on, then the electrical contacts 1020 are closed, and finally the triac 1022 is turned off. When operating from an ON to OFF operation, the triac 1022 is first turned on, the electrical contacts 1020 are then opened, and finally the triac 1022 is turned off. Thus, the processor 150 can monitor the handle position, velocity and acceleration, and transmit a control signal(s) (e.g., open or close signal) to the solid state switch via the drive circuitry 1010 at appropriate time(s) and duration relative to handle status.

Figure 11:
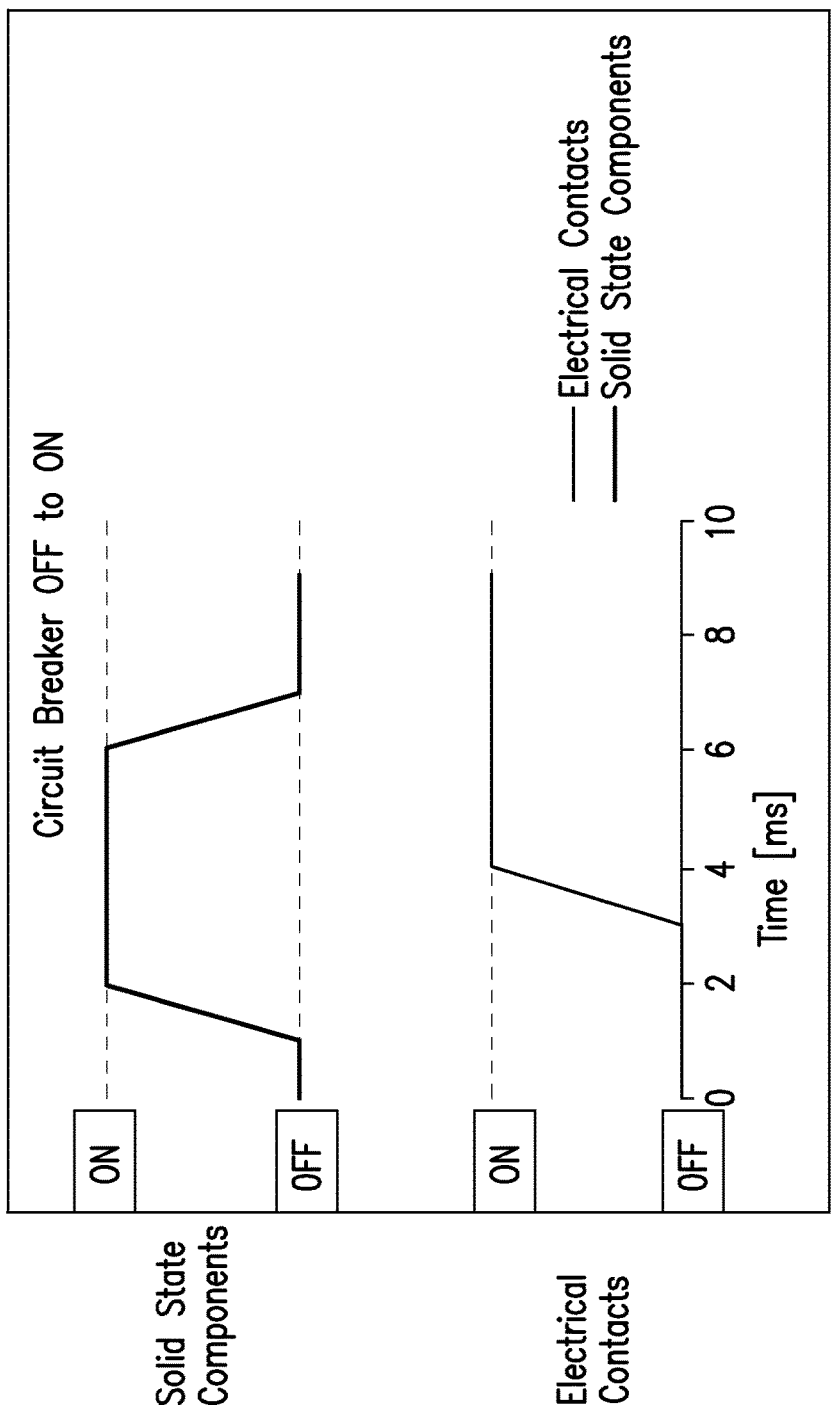
FIG. 11 illustrates an exemplary timing diagram for the operations of the mechanical components and electronic components of a circuit breaker, such as in FIG. 10, when the circuit breaker is operated from the OFF to ON position.
Figure 12:
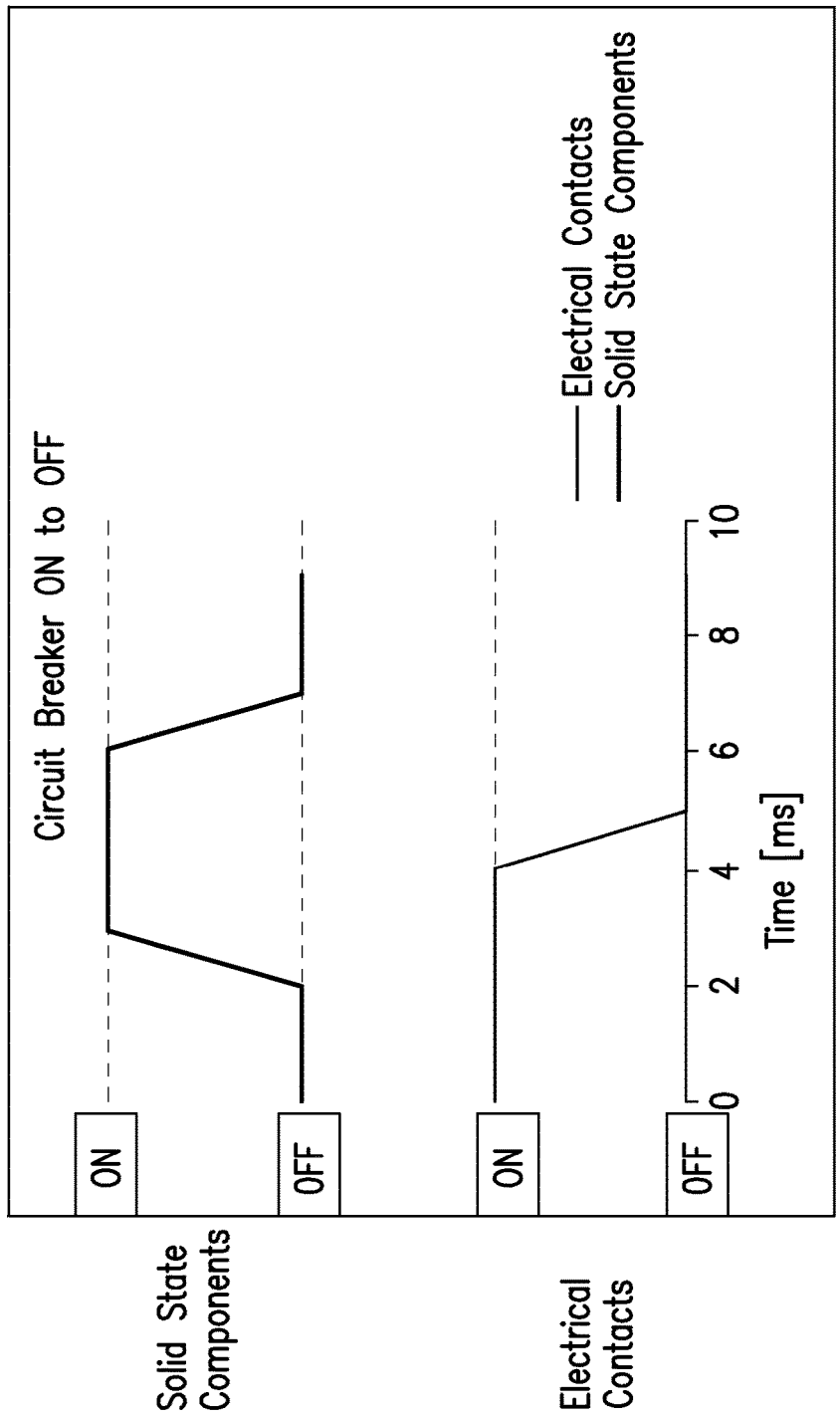
FIG. 12 illustrates an exemplary timing diagram for the operations of the mechanical components and electronic components of a circuit breaker, such as in FIG. 10, when the circuit breaker is operated from the ON to OFF position.

The operations in references 902 through 908 may be implemented under control of the processor 150, and repeated in response to a condition, e.g., occurrence of a handle operation from one position to another position. Exemplary timing sequences for operating the electrical contacts and the solid state components of a hybrid circuit breaker are shown in FIGS. 11 and 12. FIG. 11 illustrates an example timing sequence from an OFF to ON circuit breaker operation, and FIG. 12 illustrates an example timing sequence from an ON to OFF circuit breaker operation. Although FIGS. 9 through 12 are described above with reference to an exemplary hybrid switching implementation for a hybrid circuit breaker, the status monitoring system may also be used to implement full electronic switching in smaller fully electronic circuit breakers that do not include mechanical-type electrical contacts (circuit interrupters) but instead turn on and off the circuit breaker completely through the use of solid state components.

The illustrated embodiments of FIGS. 1 through 12 are simply provided as examples. The status monitoring system and method may be employed with any type or size of circuit breaker with a movable handle. Furthermore, the magnet, which is movable with the handle, may be formed in various shapes and sizes, and may be formed as one or more parts to move along with the handle.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A circuit breaker comprising:
   a handle movable between different positions which correspond to different circuit breaker statuses, the handle including a magnet movable with the handle; and
   a magnetic sensor, arranged in proximity to the handle, to sense a magnetic field produced from the magnet of the handle, the sensed magnetic field varying according to a location of the magnet of the handle relative to the location of the magnetic sensor; and
   a processor to receive information of the sensed magnetic field from the magnetic sensor and to determine a status of the circuit breaker based on the sensed magnetic field which relates to a position of the handle.

2. The circuit breaker of claim 1, further comprising:
   a transmitter for transmitting the determined status to a remote device.

3. The circuit breaker of claim 1, wherein the status comprises one of an open position, a closed position or a tripped position.

4. The circuit breaker of claim 1, wherein the magnet is formed as a dowel in the handle.

5. The circuit breaker of claim 1, wherein the magnetic sensor comprises a Hall Effect sensor.

6. The circuit breaker of claim 1, wherein the processor is further configured to:
   determine a velocity or acceleration of the handle from a plurality of measurements of the magnetic field sensed by the magnetic sensor over a period of time as the handle moves during operation of the circuit breaker.

7. The circuit breaker of claim 1, wherein, to determine a status, the processor determines a position, velocity or acceleration of the handle from the magnetic field sensed by the magnetic sensor, the processor being further configured to determine a diagnostic status of the circuit breaker based on the determined position, velocity or acceleration of the handle.

8. The circuit breaker of claim 1, further comprising:
   a set of electrical contacts; and
   a solid state switch connected in parallel to the set of electrical contacts,
   wherein, to determine a status, the processor determines a position, velocity or acceleration of the handle from the magnetic field sensed by the magnetic sensor, the processor being further configured to coordinate operation of the set of electrical contacts and the solid state switch based on the determined position, velocity or acceleration.

9. A method of monitoring a status of a circuit breaker having a handle movable between different positions which correspond to different circuit breaker statuses, the method comprising:
   sensing a magnetic field produced from a magnet movable with a handle of the circuit breaker, the sensed magnetic field varying according to a location of the magnet of the handle relative to the location of the magnetic sensor; and
   determining a status of the circuit breaker based on the sensed magnetic field which relates to a position of the handle.

10. The method of claim 9, further comprising:
    transmitting the determined status.

11. The method of claim 10, wherein the determined status is transmitted to a remote device.

12. The method of claim 9, wherein the status comprises one of an open position, a closed position or a tripped position.

13. The method of claim 9, further comprising:
    determining a velocity or acceleration of the handle from a plurality of measurements of the magnetic field sensed by the magnetic sensor over a period of time as the handle moves during operation of the circuit breaker.

14. The method of claim 13, further comprising:
    coordinating operation of a set of electrical contacts and a solid state switch of the circuit breaker based on the determined position, velocity or acceleration, the solid state switch being connected in parallel to the electrical contacts.

15. The method of claim 9, wherein determining a status comprises determining a position, velocity or acceleration of the handle from the magnetic field sensed by the magnetic sensor, the method further comprising:
    determining a diagnostic status of the circuit breaker based on the determined position, velocity or acceleration of the handle.

16. The circuit breaker of claim 1, further comprising:
    a cover for retaining therein components of the circuit breaker, including the magnetic sensor and a portion of the handle.

17. The circuit breaker of claim 1, wherein the handle is operable by a user.

* * * * *